(12) United States Patent
Liu et al.

(10) Patent No.: US 11,947,680 B2
(45) Date of Patent: Apr. 2, 2024

(54) MODEL PARAMETER TRAINING METHOD, TERMINAL, AND SYSTEM BASED ON FEDERATION LEARNING, AND MEDIUM

(71) Applicant: WEBANK CO., LTD, Shenzhen (CN)

(72) Inventors: Yang Liu, Shenzhen (CN); Yan Kang, Shenzhen (CN); Tianjian Chen, Shenzhen (CN); Qiang Yang, Shenzhen (CN); Tao Fan, Shenzhen (CN)

(73) Assignee: WEBANK CO., LTD, Shenzhen (CN)

( * ) Notice: Subject to any disclaimer, the term of this patent is extended or adjusted under 35 U.S.C. 154(b) by 550 days.

(21) Appl. No.: 17/239,623

(22) Filed: Apr. 25, 2021

(65) Prior Publication Data

US 2021/0248244 A1    Aug. 12, 2021

Related U.S. Application Data

(63) Continuation of application No. PCT/CN2019/119226, filed on Nov. 18, 2019.

(30) Foreign Application Priority Data

Dec. 28, 2018    (CN) .................. 201811620130.X

(51) Int. Cl.
| | |
|---|---|
| *G06F 21/60* | (2013.01) |
| *G06F 21/62* | (2013.01) |
| *G06N 5/04* | (2023.01) |
| *G06N 20/00* | (2019.01) |
| *G06N 20/20* | (2019.01) |

(52) U.S. Cl.
CPC ........ *G06F 21/602* (2013.01); *G06F 21/6218* (2013.01); *G06N 5/04* (2013.01); *G06N 20/00* (2019.01); *G06N 20/20* (2019.01)

(58) Field of Classification Search
CPC .. G06F 21/602; G06F 21/6218; G06F 18/214; G06N 5/04; G06N 20/00; G06N 20/20; Y04S 40/20
See application file for complete search history.

(56) References Cited

U.S. PATENT DOCUMENTS

| | | | |
|---|---|---|---|
| 11,205,137 B2 * | 12/2021 | Benke | H04L 9/50 |
| 11,605,013 B2 * | 3/2023 | Manamohan | H04L 9/3239 |

(Continued)

FOREIGN PATENT DOCUMENTS

| | | |
|---|---|---|
| CN | 106096641 A | 11/2016 |
| CN | 106649434 A | 5/2017 |

(Continued)

OTHER PUBLICATIONS

Grant Notification issued in counterpart Chinese Patent Application No. 201811620130.X, dated Jun. 25, 2021.

(Continued)

*Primary Examiner* — Cheng-Feng Huang
(74) *Attorney, Agent, or Firm* — Westbridge IP LLC

(57) ABSTRACT

Disclosed are a model parameter training method and a terminal based on federation learning, and a medium. The method includes: determining a feature intersection of a first sample of the first terminal and a second sample of a second terminal, training the first sample based on the feature intersection to obtain a first mapping model, sending the first mapping model to the second terminal; receiving a second encryption mapping model sent by the second terminal, predicting a missing feature of the first sample of the first terminal according to the second encryption mapping model to obtain a first encryption supplementary sample; receiving a first encryption federation learning model parameter sent by a third terminal, training a federation learning model to be trained according to the first encryption federation learning model parameter, and calculating a first encryption loss value; and sending the first encryption loss value to the third terminal.

11 Claims, 3 Drawing Sheets

(56) References Cited

U.S. PATENT DOCUMENTS

| | | | | |
|---|---|---|---|---|
| 2002/0164070 A1* | 11/2002 | Kuhner | ................. | G06F 18/211 |
| | | | | 382/190 |
| 2008/0082475 A1* | 4/2008 | Aggarwal | .............. | G06N 20/00 |
| | | | | 706/48 |
| 2008/0103996 A1* | 5/2008 | Forman | .................. | G06N 20/00 |
| | | | | 706/12 |
| 2018/0089587 A1* | 3/2018 | Suresh | .................. | G06N 20/00 |

FOREIGN PATENT DOCUMENTS

| | | | |
|---|---|---|---|
| CN | 108305167 A | 7/2018 | |
| CN | 108491928 A | 9/2018 | |
| CN | 108764159 A | 11/2018 | |
| CN | 108898218 A | 11/2018 | |
| CN | 109002861 A | 12/2018 | |
| CN | 109034398 A | 12/2018 | |
| CN | 109492420 A | 3/2019 | |
| WO | 2018218155 A1 | 11/2018 | |

OTHER PUBLICATIONS

Liu et al., Secure Federated Transfer Learning, Arxiv.org, Cornell University Library, XP080990694, dated Dec. 8, 2018.
Supplementary European Search Report issued in counterpart European Patent Application No. 19905241.6, dated Jul. 12, 2022.
International Search Report and Written Opinion issued in corresponding PCT Application No. PCT/CN2019/119226, dated Feb. 18, 2020.

\* cited by examiner $X^A$

| $Y^A$ | $X_1^A$ | $X_2^A$ | $X_3^A$ | |
|---|---|---|---|---|
| | $X_1^B$ | $X_2^B$ | $X_3^B$ | $Y^B$ | sample dimension feature dimension $X^B$

FIG. 3

MODEL PARAMETER TRAINING METHOD, TERMINAL, AND SYSTEM BASED ON FEDERATION LEARNING, AND MEDIUM

CROSS-REFERENCE TO RELATED APPLICATIONS

This application is a Continuation Application of PCT Application No. PCT/CN2019/119226, filed on Nov. 18, 2019, which claims priority to Chinese Application No. 201811620130.X, filed on Dec. 28, 2018, filed with Chinese National Intellectual Property Administration, and entitled "MODEL PARAMETER TRAINING METHOD, TERMINAL, AND SYSTEM BASED ON FEDERATION LEARNING, AND MEDIUM", the entire disclosure of which is incorporated herein by reference.

TECHNICAL FIELD

The present disclosure relates to the technical field of data processing, and in particular to a model parameter training method, terminal, and system based on federation learning, and a medium.

BACKGROUND

In the field of artificial intelligence, the traditional data processing model is often that one party collects data, then transfers it to another party for processing, cleaning and modeling, and finally sells the model to a third party. However, with the improvement of regulations and stricter monitoring, if the data leaves the collector or the user is not clear about the specific purpose of the model, the operator may violate the law. Data exists in the form of islands, and the direct solution to the islands is to integrate the data into one party for processing. However, doing so now is likely to be illegal, because the law does not allow operators to crudely aggregate data.

To solve this problem, people researched and put forward the concept of "federation learning". Federation learning uses technical algorithms to encrypt the established models. Both parties of the federation can also perform model training to obtain model parameters without providing their own data. Federation learning protects user data privacy through parameter exchange under the encryption mechanism. The data and model itself will not be transmitted, and they cannot speculate the other party's data. Therefore, there is no possibility of leakage at the data level, nor does it violate more stringent data protection laws such as General Data Protection Regulation (GDPR), which can maintain data integrity at a high level while ensuring data privacy.

However, the current lateral federation method can only be applied to the situation where the sample of both parties A and B are labeled, and the feature dimensions of both parties are the same, and it is not applicable to the situation where the feature dimensions of A and B are different. Therefore, how to expand the feature space of both parties A and B under the constraints of ensuring that the data privacy of the two parties and the model are not leaked, and thereby improve the predictive ability of the federation model, is an urgent problem to be solved.

SUMMARY

The main objective of the present disclosure is to provide a model parameter training method, terminal, and system based on federation learning, and a medium, which aims to realize the use of transfer learning to expand the feature space of both parties under the constraints of ensuring the data privacy of the two parties and the model not being leaked, thereby improving the predictive ability of the federation model, under the condition that the feature spaces of the samples of the two parties are different.

In order to achieve the above objective, the present disclosure provides a model parameter training method based on federation learning, applied to a first terminal, including the following operations:

determining a feature intersection of a first sample of the first terminal and a second sample of a second terminal, training the first sample based on the feature intersection to obtain a first mapping model, encrypting and sending the first mapping model to the second terminal, for the second terminal to predict a missing feature of the second sample to obtain a second encryption supplementary sample;

receiving a second encryption mapping model sent by the second terminal, predicting a missing feature of the first sample of the first terminal according to the second encryption mapping model to obtain a first encryption supplementary sample, wherein the second encryption mapping model is obtained by the second terminal training the second sample based on the feature intersection;

receiving a first encryption federation learning model parameter sent by a third terminal, training a federation learning model to be trained according to the first encryption federation learning model parameter, the first sample and the first encryption supplementary sample, and calculating a first encryption loss value;

sending the first encryption loss value to the third terminal, for the third terminal to calculate a loss sum according to the first encryption loss value and a second encryption loss value, determining whether the federation learning model to be trained is in a convergent state according to the loss sum, wherein the second encryption loss value is calculated by the second terminal according to the second sample, the second encryption supplementary sample, and the first encryption federation learning model parameter sent by the third terminal; and using the first encryption federation learning model parameter as a final parameter of the federation learning model to be trained after receiving a stop training instruction sent by the third terminal, wherein the stop training instruction is sent by the third terminal after determining that the federation learning model to be trained is in the convergent state.

Besides, in order to achieve the above objective, the present disclosure further provides a terminal. The terminal is a first terminal. The first terminal includes a memory, a processor, and a model parameter training program based on federation learning stored in the memory and executable on the processor, the model parameter training program based on federation learning, when executed by the processor, implements the operations of the model parameter training method based on federation learning described above.

The present disclosure further provides a terminal. The terminal is a third terminal. The third terminal includes a memory, a processor, and a model parameter training program based on federation learning stored in the memory and executable on the processor, the model parameter training program based on federation learning, when executed by the processor, implements the operations of the model parameter training method based on federation learning described above.

The present disclosure further provides a model parameter training system based on federation learning, including at least one first terminal described above, at least one third terminal described above, and at least one second terminal interacting with the first terminal and the third terminal.

In addition, in order to achieve the above objective, the present disclosure further provides a storage medium, applied to a computer. The storage medium stores a model parameter training program based on federation learning, the model parameter training program based on federation learning, when executed by a processor, implements the operations of the model parameter training method based on federation learning described above.

The present disclosure provides a model parameter training method based on federation learning, including: determining a feature intersection of a first sample of the first terminal and a second sample of a second terminal, training the first sample based on the feature intersection to obtain a first mapping model, sending the first mapping model to the second terminal; receiving a second encryption mapping model sent by the second terminal, predicting a missing feature of the first sample of the first terminal according to the second encryption mapping model to obtain a first encryption supplementary sample; receiving a first encryption federation learning model parameter sent by a third terminal, training a federation learning model to be trained according to the first encryption federation learning model parameter, and calculating a first encryption loss value; sending the first encryption loss value to the third terminal; and using the first encryption federation learning model parameter as a final parameter of the federation learning model to be trained after receiving a stop training instruction sent by the third terminal. The present disclosure realizes the use of transfer learning to expand the feature space of both parties and improve the predictive ability of the federation model.

BRIEF DESCRIPTION OF THE DRAWINGS

FIG. 3 is a schematic diagram of a scenario of a model parameter training method based on federation learning according to a third embodiment of the present disclosure.

The realization of the objective, functional characteristics, and advantages of the present disclosure are further described with reference to the accompanying drawings.

DETAILED DESCRIPTION OF THE EMBODIMENTS

It should be understood that the specific embodiments described here are only used to explain the present disclosure, and are not intended to limit the present disclosure.

Figure 1:
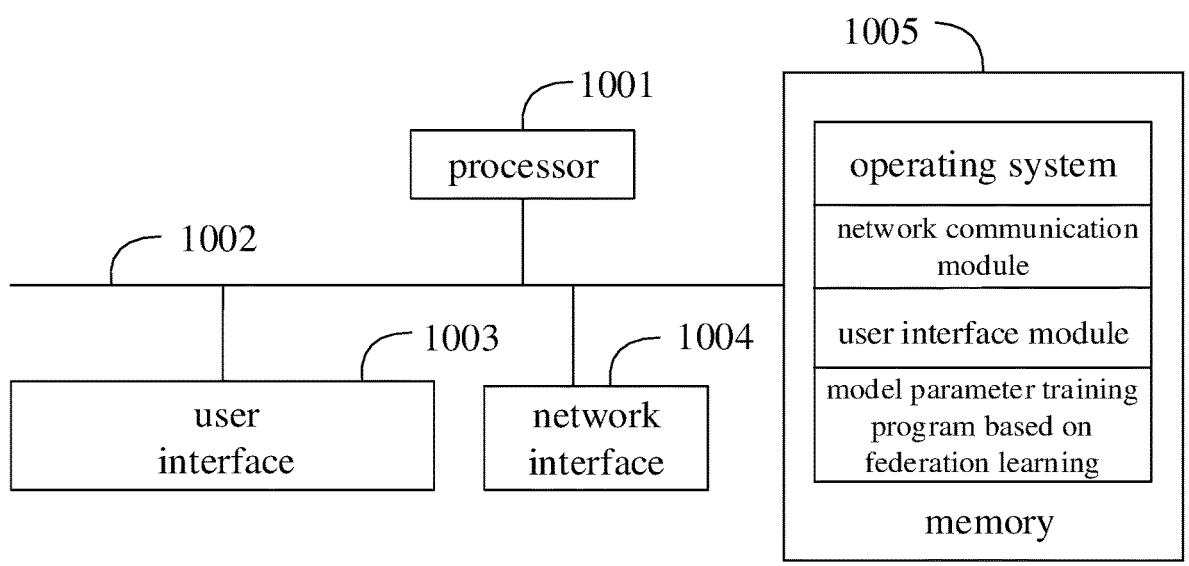
FIG. 1 is a schematic structural diagram of a hardware operating environment according to an embodiment of the present disclosure.

As shown in FIG. 1, FIG. 1 is a schematic structural diagram of a terminal of a hardware operating environment according to an embodiment of the present disclosure.

It should be noted that the terminal in the embodiment of the present disclosure may be a terminal device such as a smart phone, a personal computer, and a server, which is not specifically limited here.

As shown in FIG. 1, the model parameter training device may include a processor 1001, such as a CPU, a network interface 1004, a user interface 1003, a memory 1005, and a communication bus 1002. The communication bus 1002 is configured to implement connection and communication between the components. The user interface 1003 may include a display, an input unit such as a keyboard. The user interface 1003 may also include a standard wired interface and a wireless interface. The network interface 1004 may further include a standard wired interface and a wireless interface (such as a WI-FI interface). The memory 1005 may be a high-speed random access memory (RAM) or a non-volatile memory, such as a magnetic disk memory. The memory 1005 may also be a storage device independent of the foregoing processor 1001.

Those skilled in the art should understand that the model parameter training device structure shown in FIG. 1 does not constitute a limitation on the model parameter training device, and may include more or fewer components, a combination of some components, or differently arranged components than shown in the figure.

As shown in FIG. 1, the memory 1005 as a computer storage medium may include an operating system, a network communication module, a user interface module, and a model parameter training program based on federation learning. The operating system is a program that manages and controls the hardware and software resources of the model parameter training device, and supports the operation of the model parameter training program based on federation learning and other software or programs.

In the model parameter training device shown in FIG. 1, the user interface 1003 is mainly for data communication with various terminals. The network interface 1004 is mainly to connect to the background server and perform data communication with the background server. The processor 1001 may call a model parameter training program based on federation learning stored in the memory 1005, and execute a model parameter training method based on federation learning according to the embodiment of the present disclosure.

Besides, the embodiment of the present disclosure further provides a terminal. The terminal is a first terminal. The first terminal includes a memory, a processor, and a model parameter training program based on federation learning stored in the memory and executable on the processor, the model parameter training program based on federation learning, when executed by the processor, implements the operations of the model parameter training method based on federation learning described above.

The method implemented when the model parameter training program based on federation learning running on the processor is executed can refer to the various embodiments of the model parameter training method based on federation learning of the present disclosure, which will not be repeated here.

Besides, the embodiment of the present disclosure further provides a terminal. The terminal is a third terminal. The third terminal includes a memory, a processor, and a model parameter training program based on federation learning stored in the memory and executable on the processor, the model parameter training program based on federation learning, when executed by the processor, implements the operations of the model parameter training method based on federation learning described above.

The method implemented when the model parameter training program based on federation learning running on the processor is executed can refer to the various embodiments of the model parameter training method based on federation learning of the present disclosure, which will not be repeated here.

Besides, the embodiment of the present disclosure further provides a model parameter training system based on federation learning, including at least one first terminal described above, at least one third terminal described above, and at least one second terminal interacting with the first terminal and the third terminal.

In addition, the embodiment of the present disclosure further provides a computer readable storage medium. The storage medium stores a model parameter training program based on federation learning, the model parameter training program based on federation learning, when executed by a processor, implements the operations of the model parameter training method based on federation learning described above.

The method implemented when the model parameter training program based on federation learning running on the processor is executed can refer to the various embodiments of the model parameter training method based on federation learning of the present disclosure, which will not be repeated here.

Based on the above structure, various embodiments of the model parameter training method based on federation learning are proposed.

Figure 2:
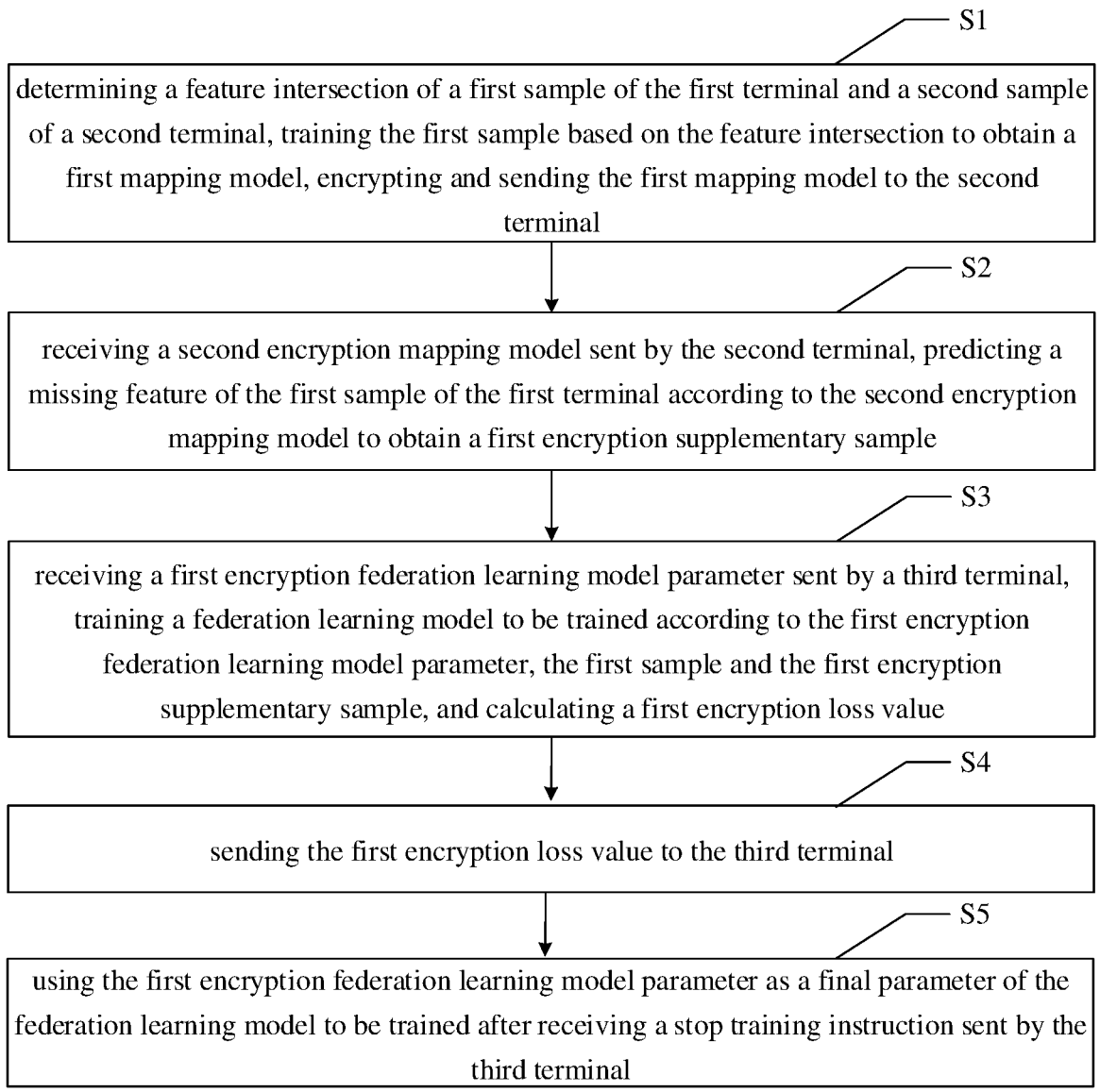
FIG. 2 is a schematic flowchart of a model parameter training method based on federation learning according to a first embodiment of the present disclosure.

As shown in FIG. 2, FIG. 2 is a schematic flowchart of a model parameter training method based on federation learning according to a first embodiment of the present disclosure.

The embodiment of the present disclosure provides an embodiment of a model parameter training method based on federation learning. It should be noted that although the logical sequence is shown in the flowchart, in some cases, the operations shown or described may be performed in a different order than here.

The model parameter training method based on federation learning according to a first embodiment of the present disclosure is applied to a first terminal. The first terminal, the second terminal, and the third terminal in the embodiment of the present disclosure may be a terminal device such as a smart phone, a personal computer, and a server, which are not specifically limited here.

The model parameter training method based on federation learning of the embodiment includes:

Operation S1, determining a feature intersection of a first sample of the first terminal and a second sample of a second terminal, training the first sample based on the feature intersection to obtain a first mapping model, encrypting and sending the first mapping model to the second terminal, for the second terminal to predict a missing feature of the second sample to obtain a second encryption supplementary sample.

"Machine learning" is one of the core research areas of artificial intelligence. How to continue machine learning under the premise of protecting data privacy and meeting legal compliance requirements is a trend in the field of machine learning. In this context, people researched and put forward the concept of "federation learning".

Federation learning uses technical algorithms to encrypt the established models. Both parties of the federation can also perform model training to obtain model parameters without providing their own data. Federation learning protects user data privacy through parameter exchange under the encryption mechanism. The data and model itself will not be transmitted, and they cannot guess the other party's data. Therefore, there is no possibility of leakage at the data level, nor does it violate more stringent data protection laws such as General Data Protection Regulation (GDPR), which can maintain data integrity at a high level while ensuring data privacy.

However, the current lateral federation method can only be applied to the situation where the sample of both parties A and B are labeled, and the feature dimensions of both parties are the same, and it is not applicable to the situation where the feature dimensions of A and B are different. In order to solve the problem, various embodiments of the model parameter training method based on federation learning are proposed.

The present disclosure is based on lateral federation learning. Lateral federation learning refers to the situation where the user features of the two data sets (that is, the first sample and the second sample described in the embodiments of the present disclosure) overlap more, but the users of the two data sets overlap less. The data set is divided laterally (i.e., user dimension), and the data that has the same user features but not the same users is taken out for training. This method is called lateral federation learning. For example, there are two banks in different regions, and their user groups come from their respective regions, and their mutual intersections are small. However, their businesses are very similar, so the recorded user features are the same.

In this embodiment, the sample dimensions of the first sample of the first terminal and the second sample of the second terminal are different, and the feature dimensions partially overlap.

First, the first terminal determines the overlapping part of the feature dimensions of the first sample and the second sample. Based on the intersection of the overlapping part, the non-overlapping part of the first sample and the overlapping part are trained to obtain a function mapping model from the overlapping part to the non-overlapping part, that is, a first mapping model, and the first mapping model is encryption through a preset encryption algorithm to obtain a first encryption mapping model and the first encryption mapping model is sent to the second terminal. After receiving the first encryption mapping model, the second terminal uses the first encryption mapping model to predict the missing feature of the second sample to obtain a second encryption supplementary sample.

The preset encryption algorithm is Homomorphic Encryption.

Operation S2, receiving a second encryption mapping model sent by the second terminal, predicting a missing feature of the first sample of the first terminal according to the second encryption mapping model to obtain a first encryption supplementary sample, wherein the second encryption mapping model is obtained by the second terminal training the second sample based on the feature intersection.

Meanwhile, the second terminal determines the overlapping part of the feature dimensions of the first sample and the second sample. Based on the intersection of the overlapping part, the non-overlapping part of the second sample and the overlapping part are trained to obtain a function mapping model from the overlapping part to the non-overlapping part, that is, a second mapping model, and the second mapping model is encryption through a preset encryption algorithm to obtain a second encryption mapping model and the second encryption mapping model is sent to the first terminal. After receiving the second encryption mapping model, the first terminal uses the second encryption mapping model to predict the missing feature of the first sample to obtain a first encryption supplementary sample.

The preset encryption algorithm is Homomorphic Encryption.

Operation S3, receiving a first encryption federation learning model parameter sent by a third terminal, training a federation learning model to be trained according to the first encryption federation learning model parameter, the first sample and the first encryption supplementary sample, and calculating a first encryption loss value.

After the first terminal and the second terminal respectively predict and complete the missing features, the lateral federation learning model is performed based on the complete data of the first terminal and the second terminal, that is, the federation learning model to be trained. The third terminal sends the first encryption federation learning model parameter of the federation learning model to be trained to the first terminal and the second terminal respectively, such that the first terminal trains the federation learning model to be trained according to the first encryption federation learning model parameter, the first sample, and the first encryption supplementary sample, and calculates the encryption loss value as the first encryption loss value, and the second terminal trains the federation learning model to be trained according to the first encryption federation learning model parameter, the second sample, and the second supplementary sample, and calculates the encryption loss value as the second encryption loss value.

Operation S4, sending the first encryption loss value to the third terminal, for the third terminal to calculate a loss sum according to the first encryption loss value and a second encryption loss value, determining whether the federation learning model to be trained is in a convergent state according to the loss sum, wherein the second encryption loss value is calculated by the second terminal according to the second sample, the second encryption supplementary sample, and the first encryption federation learning model parameter sent by the third terminal.

After the first terminal and the second terminal respectively calculate the first encryption loss value and the second encryption loss value according to the first encryption federation learning model parameter, the first encryption loss value and the second encryption loss value are sent to the third terminal. After receiving the first encryption loss value and the second encryption loss value, the third terminal calculates a loss sum according to the first encryption loss value and the second encryption loss value. There are two ways to achieve it. One way is that the third terminal first decrypts the first encryption loss value and the second encryption loss value through a preset decryption algorithm to obtain a first loss value and a second loss value, then calculates a sum of the first loss value and the second loss value as the loss sum. Another way is that the third terminal first sums the first encryption loss value and the second encryption loss value to obtain an encryption loss sum, and then decrypts the encryption loss sum through a preset decryption algorithm to obtain the loss sum.

It is sufficient to choose one of the above two ways, and this embodiment does not limit specific choices.

After obtaining the loss sum, the third terminal determines whether the federation learning model to be trained is in a convergent state according to the loss sum.

If the loss sum is less than or equal to a preset threshold, it is determined that the federation learning model to be trained is in a convergent state. If the loss sum is greater than the preset threshold, it is determined that the federation learning model to be trained is in a non-convergent state.

The value of the preset threshold can be set by the user or the operation and maintenance personnel as needed, and this embodiment does not limit it.

Operation S5, using the first encryption federation learning model parameter as a final parameter of the federation learning model to be trained after receiving a stop training instruction sent by the third terminal, wherein the stop training instruction is sent by the third terminal after determining that the federation learning model to be trained is in the convergent state.

When determining that the federation learning model to be trained is in a convergent state, the third terminal send a stop training instruction to the first terminal and the second terminal, and uses the first encryption federation learning model parameter as a final parameter of the federation learning model to be trained, that is, the optimal parameter. When the first terminal and the second terminal receive the stop training instruction, the first encryption federation learning model parameter is used as the final parameter of the federation learning model to be trained.

In this embodiment, the third terminal determines that the federation learning model to be trained is in a convergent state according to the decrypted loss sum, and uses the corresponding first encryption federation learning model parameter as the final parameter of the federation learning model to be trained, and the training of the federation learning model to be trained is completed.

Further, in the model parameter training method based on federation learning according to a second embodiment of the present disclosure, after the operation of S4, further includes:

Operation S41, calculating and sending a first encryption gradient value corresponding to the first encryption loss value to the third terminal after receiving a continuing training instruction sent by the third terminal, for the third terminal to calculate a gradient sum according to the first encryption gradient value and a second encryption gradient value, updating the first encryption federation learning model parameter according to the gradient sum to obtain a second encryption federation learning model parameter, wherein the second encryption gradient value is calculated by the second terminal according to the second sample, the second encryption supplementary sample, and the first encryption federation learning model parameter sent by the third terminal, the continuing training instruction is sent by the third terminal after determining that the federation learning model to be trained is in a non-convergent state.

When determining that the federation learning model to be trained is in a non-convergent state, the third terminal sends a continuing training instruction to the first terminal and the second terminal. When receiving the continuing training instruction, the first terminal calculates and sends the first encryption gradient value corresponding to the first encryption loss value to the third terminal. When receiving the continuing training instruction, the second terminal calculates and sends the second encryption gradient value corresponding to the second encryption loss value to the third terminal.

There is another implementation manner in this embodiment. The first terminal and the second terminal simultaneously send the encryption gradient value to the third terminal when they send the encryption loss value to the third terminal last time. When the third terminal determines that the federation learning model to be trained is in a non-convergent state, the encryption gradient sum is calculated and decrypted to obtain the gradient sum. The third terminal updates the first encryption federation learning model parameter according to the gradient sum, to obtain the second encryption federation learning model parameter.

One of the above two implementation manners of sending the encryption gradient value to the third terminal can be chosen, and the specific choice is not limited in this embodiment.

Operation S42, obtaining the second encryption federation learning model parameter sent by the third terminal, and calculating a third encryption loss value of the first terminal according to the second encryption federation learning model parameter.

After receiving the first encryption gradient value and the second encryption gradient value, the third terminal calculates a gradient sum according to the first encryption gradient value and the second encryption gradient value. There are two ways to achieve it. One way is that the third terminal first decrypts the first encryption gradient value and the second encryption gradient value through a preset decryption algorithm to obtain a first gradient value and a second gradient value, then calculates a sum of the first gradient value and the second gradient value as the gradient sum. Another way is that the third terminal first sums the first encryption gradient value and the second encryption gradient value to obtain an encryption gradient sum, and then decrypts the encryption gradient sum through a preset decryption algorithm to obtain the gradient sum.

It is sufficient to choose one of the above two ways, and this embodiment does not limit specific choices.

After obtaining the gradient sum, the third terminal updates the first encryption federation learning model parameter according to the gradient sum, to obtain the second encryption federation learning model parameter, and sends the second encryption federation learning model parameter to the first terminal and the second terminal.

The first terminal obtains the second encryption federation learning model parameter sent by the third terminal, and calculates a new encryption loss value of the first terminal according to the second encryption federation learning model parameter, that is, a third encryption loss value. The second terminal obtains the second encryption federation learning model parameter sent by the third terminal, and calculates a new encryption loss value of the second terminal according to the second encryption federation learning model parameter, that is, a fourth encryption loss value.

Operation S43, sending the third encryption loss value to the third terminal for the third terminal to calculate a new loss sun according to the third encryption loss value and a fourth encryption loss value, determining whether the federation learning model to be trained is in a convergent state according to the new loss sum, wherein the fourth encryption loss value is calculated by the second terminal according to the second sample, the second encryption supplementary sample, and the second encryption federation learning model parameter sent by the third terminal.

After obtaining the third encryption loss value and the fourth encryption loss value according to the second encryption federation learning model parameter, the first terminal and the second terminal send the third encryption loss value and the fourth encryption loss value to the third terminal respectively. After receiving the third encryption loss value and the fourth encryption loss value sent by the first terminal and the second terminal, the third terminal calculates the loss sum of the third encryption loss value and the fourth encryption loss value to obtain a new loss sum. The third terminal then determines whether the federation learning model to be trained is in a convergent state according to the new loss. Specifically, if the loss sum is less than or equal to the preset threshold, it is determined that the federation learning model to be trained is in a convergent state. If the loss sum is greater than the preset threshold, it is determined that the federation learning model to be trained is in a non-convergent state.

The value of the preset threshold can be set by the user or the operation and maintenance personnel as needed, and this embodiment does not limit it.

Operation S44, using the second encryption federation learning model parameter as a final parameter of the federation learning model to be trained after receiving a stop training instruction sent by the third terminal.

When determining that the federation learning model to be trained is in a convergent state, the third terminal sends a stop training instruction to the first terminal and the second terminal, and uses the second encryption federation learning model parameter as the final parameter of the federation learning model to be trained, that is, the optimal parameter. When the first terminal and the second terminal receive the training stop instruction, the second encryption federation learning model parameter is used as the final parameter of the federation learning model to be trained.

Further, after the operation of S5, the method further includes:

Operation S51, obtaining a first encryption prediction result based on the final parameter of the federation learning model to be trained and the first sample or the first encryption supplementary sample, sending the first encryption prediction result to the third terminal.

After determining the optimal parameter of the federation learning model to be trained, both the first terminal and the second terminal can use the optimal parameter, but the optimal parameter is encrypted. The first terminal may obtain the first encryption prediction result through the first sample, the first encryption supplementary sample, and the encryption optimal parameter, and send the first encryption prediction result to the third terminal for decryption.

Operation S52, obtaining a first prediction result decrypted by the third terminal after the third terminal decrypts the first encryption prediction result.

After receiving the first encryption prediction result, the third terminal decrypts the first encryption prediction result through a preset decryption algorithm to obtain the first prediction result, and sends the first prediction result to the first terminal. Correspondingly, the second terminal may also perform similar operations as the first terminal.

In this embodiment, calculating and sending a first encryption gradient value corresponding to the first encryption loss value to the third terminal after receiving a continuing training instruction sent by the third terminal, for the third terminal to calculate a gradient sum according to the first encryption gradient value and a second encryption gradient value, updating the first encryption federation learning model parameter according to the gradient sum to obtain a second encryption federation learning model parameter; obtaining the second encryption federation learning model parameter sent by the third terminal, and calculating a third encryption loss value of the first terminal according to the second encryption federation learning model parameter; sending the third encryption loss value to the third terminal for the third terminal to calculate a new loss sun according to the third encryption loss value and a fourth encryption loss value, determining whether the federation learning model to be trained is in a convergent state according to the new loss sum; and using the second encryption federation learning model parameter as a final parameter of the federation learning model to be trained after receiving a stop training instruction sent by the third terminal. In this way, the third terminal combines the sample data of the first terminal and the second terminal to calculate the loss sum, to jointly help determine the model parameters in the federation learning model to be trained by combining the sample data of the first terminal and the second terminal, and the accuracy of the trained model is improved.

Further, the model parameter training method based on federation learning according to a third embodiment of the present disclosure is proposed. In this embodiment, the model parameter training method based on federation learning, applied to a third terminal, including the following operations:

Operation C1, after a first terminal uses a second encryption mapping model of a second terminal to predict a missing feature of a first sample of the first terminal to obtain a first encryption supplementary sample, and the second terminal uses a first encryption mapping model of the first terminal to predict a missing feature of a second sample of the second terminal to obtain a second encryption supplementary sample, sending, by the third terminal, a first encryption federation learning model parameter to the first terminal and the second terminal, for the first terminal to calculate a first encryption loss value according to the first encryption federation learning model parameter, the first sample and the first encryption supplementary sample, and for the second terminal to calculate a second encryption loss value according to the first encryption federation learning model parameter, the second sample and the second encryption supplementary sample, wherein the second encryption mapping model is obtained by training the second sample by a feature intersection of the first sample and the second sample, the first encryption mapping model is obtained by training the first sample by the feature intersection.

In this embodiment, the sample dimensions of the first sample of the first terminal and the second sample of the second terminal are different, and the feature dimensions partially overlap.

First, the first terminal determines the overlapping part of the feature dimensions of the first sample and the second sample. Based on the intersection of the overlapping part, the non-overlapping part of the first sample and the overlapping part are trained to obtain a function mapping model from the overlapping part to the non-overlapping part, that is, a first mapping model, and the first mapping model is encryption through a preset encryption algorithm to obtain a first encryption mapping model and the first encryption mapping model is sent to the second terminal. After receiving the first encryption mapping model, the second terminal uses the first encryption mapping model to predict the missing feature of the second sample to obtain a second encryption supplementary sample.

Meanwhile, the second terminal determines the overlapping part of the feature dimensions of the first sample and the second sample. Based on the intersection of the overlapping part, the non-overlapping part of the second sample and the overlapping part are trained to obtain a function mapping model from the overlapping part to the non-overlapping part, that is, a second mapping model, and the second mapping model is encryption through a preset encryption algorithm to obtain a second encryption mapping model and the second encryption mapping model is sent to the first terminal. After receiving the second encryption mapping model, the first terminal uses the second encryption mapping model to predict the missing feature of the first sample to obtain a first encryption supplementary sample.

The preset encryption algorithm is Homomorphic Encryption.

After the first terminal and the second terminal respectively predict and complete the missing features, the lateral federation learning model is performed based on the complete data of the first terminal and the second terminal, that is, the federation learning model to be trained. The third terminal sends the first encryption federation learning model parameter of the federation learning model to be trained to the first terminal and the second terminal respectively, such that the first terminal trains the federation learning model to be trained according to the first encryption federation learning model parameter, the first sample, and the first encryption supplementary sample, and calculates the encryption loss value as the first encryption loss value, and the second terminal trains the federation learning model to be trained according to the first encryption federation learning model parameter, the second sample, and the second supplementary sample, and calculates the encryption loss value as the second encryption loss value.

Operation C2, receiving and calculating a loss sum according to the first encryption loss value sent by the first terminal and the second encryption loss value sent by the second terminal, and determining whether the federation learning model to be trained is in a convergent state according to the loss sum.

After the first terminal and the second terminal respectively calculate the first encryption loss value and the second encryption loss value according to the first encryption federation learning model parameter, the first encryption loss value and the second encryption loss value are sent to the third terminal. After receiving the first encryption loss value and the second encryption loss value, the third terminal calculates a loss sum according to the first encryption loss value and the second encryption loss value. There are two ways to achieve it. One way is that the third terminal first decrypts the first encryption loss value and the second encryption loss value through a preset decryption algorithm to obtain a first loss value and a second loss value, then calculates a sum of the first loss value and the second loss value as the loss sum. Another way is that the third terminal first sums the first encryption loss value and the second encryption loss value to obtain an encryption loss sum, and then decrypts the encryption loss sum through a preset decryption algorithm to obtain the loss sum.

It is sufficient to choose one of the above two ways, and this embodiment does not limit specific choices.

After obtaining the loss sum, the third terminal determines whether the federation learning model to be trained is in a convergent state according to the loss sum.

Operation C3, sending the first encryption federation learning model parameter as a final parameter of the federation learning model to be trained after determining that the federation learning model to be trained is in the convergent state.

If the loss sum is less than or equal to the preset threshold, the third terminal determines that the federation learning model to be trained is in a convergent state, and sends a stop training instruction to the first terminal and the second terminal, and uses the first encryption federation learning model parameter as the final parameter of the federation learning model to be trained, that is, the optimal parameter. When the first terminal and the second terminal receive the stop training instruction, the first encryption federation learning model parameter is used as the final parameter of the federation learning model to be trained.

To assist understanding, here is an example: as shown in FIG. 3, the sample dimensions of A and B are different, and the features are partially overlapped. Party B has annotated data $(X^B, Y^B)$, and party A has annotated data $(X^A, Y^A)$. The system consists of three parties, A, B, and C. Party C generates an encryption public key and a private key, and decrypts the encryption information from both parties A and B based on the private key. Before training, party C distributes the public key to party A and party B. First, party A and party B determine the intersection feature $X_2^A$, $X_2^B$ of the two parties. As for the party A, we define $X_1^A = \{X_{1,j}^A\}_{j=1}^n$ as a set of n features. For each feature $X_{1,j}^A$ a function mapping model $f_j^A: X_2^A \to X_{1,j}^A$, from $X_2^A$ to $X_{1,j}^A$ is trained. The function mapping model is obtained by training the following objective function: min $L(X_{1,j}^A, f_j^A(X_2^A, \theta_j^A)) + \gamma \|\theta_j^A\|_F^2$. Similarly, as for the party B, we define $X_3^B = \{X_{3,k}^B\}_{k=1}^m$ as a set of m features. For each feature $X_{3,k}^B$, a function mapping model $f_k^B: X_2^B \to X_{3,k}^B$ from $X_2^B$ to $X_{3,k}^B$ is trained. The function mapping model is obtained by training the following objective function: min $L(X_{3,k}^B, f_k^B(X_2^B, \theta_k^B)) + \gamma \|\theta_k^B\|_F^2$. Both parties A and B perform feature completion, and party A sends the encryption model $\{[[f_j^A]]\}_{j=1}^n$ to party B. Party B uses $\{[[f_j^A]]\}_{j=1}^n$ to predict the missing feature $X_1^B$ to obtain $[[X_1^B]]$. In the same way, party B sends the encryption model $\{[[f_k^B]]\}_{k=1}^m$ to party A, and party A uses $\{[[f_k^B]]\}_{k=1}^m$ to predict the missing feature $X_3^A$ to obtain $[[X_3^A]]$.

Then, both parties A and B conduct lateral federation learning. Party C initializes the model parameter W, encrypts W to obtain $[[W]]$, and then sends $[[W]]$ to parties A and B. Both parties A and B respectively calculate the encryption loss B according to $[[W]]$, and send the encryption loss to party C. Party C decrypts the loss, and sums up the losses to obtain $l^C$. Party C determines whether the federation learning model to be trained is in a convergent state according to the loss value $l^C$. If the federation learning model to be trained is in a convergent state, the training ends, and $[[W]]$ is used as the final parameter.

L refers to a loss function, θ refers to a model parameter, λ refers to a regular expression parameter, and F refers to a sum of squares.

In this embodiment, the third terminal determines that the federation learning model to be trained is in a convergent state according to the decrypted loss sum, and uses the corresponding first encryption federation learning model parameter as the final parameter of the federation learning model to be trained, and the training of the federation learning model to be trained is completed.

Further, the operation of determining whether the federation learning model to be trained is in a convergent state according to the loss sum includes:
Operation C21, determining whether the federation learning model to be trained is in the convergent state according to whether the loss sum is less than or equal to a preset threshold;
Operation C22, determining that the federation learning model to be trained is in the convergent state if the loss sum is less than or equal to the preset threshold; and
Operation C23, determining that the federation learning model to be trained is in a non-convergent state if the loss sum is greater than the preset threshold.

Specially, if the loss sum is less than or equal to the preset threshold, it is determined that the federation learning model to be trained is in the convergent state. If the loss sum is greater than the preset threshold, it is determined that the federation learning model to be trained is in the non-convergent state. The value of the preset threshold can be set by the user or the operation and maintenance personnel as needed, and this embodiment does not limit it.

Further, after the operation C2, the method further includes:
Operation C201, sending a continuing training instruction to the first terminal and the second terminal after determining that the federation learning model to be trained is in a non-convergent state.

When determining that the federation learning model to be trained is in a non-convergent state, the third terminal sends a continuing training instruction to the first terminal and the second terminal. When receiving the continuing training instruction, the first terminal calculates and sends the first encryption gradient value corresponding to the first encryption loss value to the third terminal. When receiving the continuing training instruction, the second terminal calculates and sends the second encryption gradient value corresponding to the second encryption loss value to the third terminal.

Operation C202, receiving and calculating a gradient sum according to a first encryption gradient value sent by the first terminal and a second encryption gradient value sent by the second terminal, updating the first encryption federation learning model parameter according to the gradient sum to obtain a second encryption federation learning model parameter, sending the second encryption federation learning model parameter to the first terminal and the second terminal.

After receiving the first encryption gradient value and the second encryption gradient value, the third terminal calculates a gradient sum according to the first encryption gradient value and the second encryption gradient value. There are two ways to achieve it. One way is that the third terminal first decrypts the first encryption gradient value and the second encryption gradient value through a preset decryption algorithm to obtain a first gradient value and a second gradient value, then calculates a sum of the first gradient value and the second gradient value as the gradient sum. Another way is that the third terminal first sums the first encryption gradient value and the second encryption gradient value to obtain an encryption gradient sum, and then decrypts the encryption gradient sum through a preset decryption algorithm to obtain the gradient sum.

It is sufficient to choose one of the above two ways, and this embodiment does not limit specific choices.

After obtaining the gradient sum, the third terminal updates the first encryption federation learning model parameter according to the gradient sum, to obtain the second encryption federation learning model parameter, and sends the second encryption federation learning model parameter to the first terminal and the second terminal.

Operation C203, receiving and calculating a new loss sum according to a third encryption loss value send by the first terminal and a fourth encryption loss value sent by the second terminal, determining whether the federation learning model to be trained is in a convergent state according to the new loss sum, wherein the third encryption loss value is calculated by the first terminal according to the first sample, the first encryption supplementary sample, and the second encryption federation learning model parameter sent by the third terminal, and the fourth encryption loss value is calculated by the second terminal according to the second sample, the second encryption supplementary sample, and the second encryption federation learning model parameter sent by the third terminal.

The first terminal obtains the second encryption federation learning model parameter sent by the third terminal, and calculates a new encryption loss value of the first terminal according to the second encryption federation learning model parameter, that is, a third encryption loss value. The second terminal obtains the second encryption federation learning model parameter sent by the third terminal, and calculates a new encryption loss value of the second terminal according to the second encryption federation learning model parameter, that is, a fourth encryption loss value.

After obtaining the third encryption loss value and the fourth encryption loss value according to the second encryption federation learning model parameter, the first terminal and the second terminal send the third encryption loss value and the fourth encryption loss value to the third terminal respectively. After receiving the third encryption loss value and the fourth encryption loss value sent by the first terminal and the second terminal, the third terminal calculates the loss sum of the third encryption loss value and the fourth encryption loss value to obtain a new loss sum. The third terminal then determines whether the federation learning model to be trained is in a convergent state according to the new loss. Specifically, if the loss sum is less than or equal to the preset threshold, it is determined that the federation learning model to be trained is in a convergent state. If the loss sum is greater than the preset threshold, it is determined that the federation learning model to be trained is in a non-convergent state.

The value of the preset threshold can be set by the user or the operation and maintenance personnel as needed, and this embodiment does not limit it.

Operation C204, if the federation learning model to be trained is in the convergent state, sending a stop training instruction to the first terminal and the second terminal, and using the second encryption federation learning model parameter as a final parameter of the federation learning model to be trained.

When determining that the federation learning model to be trained is in the convergent state, the third terminal sends a stop training instruction to the first terminal and the second terminal, and uses the second encryption federation learning model parameter as the final parameter of the federation learning model to be trained, that is, the optimal parameter. When the first terminal and the second terminal receive the training stop instruction, the second encryption federation learning model parameter is used as the final parameter of the federation learning model to be trained.

Both parties A and B conduct lateral federation learning. Party C initializes the model parameter W, encrypts W to obtain [[W]], and then sends [[W]] to parties A and B. Both parties A and B respectively calculate the encryption loss $[[l^A]]$, $[[l^B]]$ according to [[W]], and send the encryption loss to party C. Party C decrypts the loss, and sums up the losses to obtain $l^C$. Party C determines whether the federation learning model to be trained is in a convergent state according to the loss value $l^C$. If the federation learning model to be trained is in a non-convergent state, both parties A and B calculate the gradients $[[g^A]]$, $[[g^B]]$ respectively according to [[W]], and send the encryption gradient to C. Party C calculates the gradient sum and decrypts the gradient sum to obtain $g^C$, C updates the model parameter $W_1=W-\eta g^C$, encrypts $W_1$ to obtain $[[W_1]]$, and sends $[[W_1]]$ to party A and party B. Party A and Party B calculate the new encryption loss value according to the new $[[W_1]]$ and send $[[W_1]]$ to Party C. Party C sums and decrypts to determine whether the federation learning model to be trained is in a non-convergent state. If the federation learning model to be trained is in the non-convergent state, a stop training instruction is sent to A and B, and $[[W_1]]$ is used as the final parameter.

η refers to a learning rate, which can be preset by the user or operation and maintenance personnel, which is not limited in this embodiment.

Further, after the operation C3, the method further includes:

Operation C31, receiving a first encryption prediction result sent by the first terminal.

After determining the optimal parameter of the federation learning model to be trained, both the first terminal and the second terminal can use the optimal parameter, but the optimal parameter is encrypted. The first terminal may obtain the first encryption prediction result through the first sample, the first encryption supplementary sample, and the encryption optimal parameter, and send the first encryption prediction result to the third terminal for decryption.

Operation C32, decrypting the first encryption prediction result to obtain a first prediction result, and sending the first prediction result to the first terminal.

After receiving the first encryption prediction result, the third terminal decrypts the first encryption prediction result through a preset decryption algorithm to obtain the first prediction result, and sends the first prediction result to the first terminal. Correspondingly, the second terminal may also perform similar operations as the first terminal.

In this embodiment, the third terminal combines the sample data of the first terminal and the second terminal to calculate the loss sum, to jointly help determine the model parameters in the federation learning model to be trained by combining the sample data of the first terminal and the second terminal, and the accuracy of the trained model is improved.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present disclosure can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, an air conditioner, or a network device, etc.) to execute the method described in each embodiment of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A model parameter training method based on federation learning, applied to a first terminal, comprising the following operations:

determining a feature intersection of a first sample of the first terminal and a second sample of a second terminal, training the first sample based on the feature intersection to obtain a first mapping model, encrypting and sending the first mapping model to the second terminal, for the second terminal to predict a missing feature of the second sample to obtain a second encryption supplementary sample;

receiving a second encryption mapping model sent by the second terminal, predicting a missing feature of the first sample of the first terminal according to the second encryption mapping model to obtain a first encryption supplementary sample, wherein the second encryption mapping model is obtained by the second terminal training the second sample based on the feature intersection;

receiving a first encryption federation learning model parameter sent by a third terminal, training a federation learning model to be trained according to the first encryption federation learning model parameter, the first sample and the first encryption supplementary sample, and calculating a first encryption loss value;

sending the first encryption loss value to the third terminal, for the third terminal to calculate a loss sum according to the first encryption loss value and a second encryption loss value, determining whether the federation learning model to be trained is in a convergent state according to the loss sum, wherein the second encryption loss value is calculated by the second terminal according to the second sample, the second encryption supplementary sample, and the first encryption federation learning model parameter sent by the third terminal; and using the first encryption federation learning model parameter as a final parameter of the federation learning model to be trained after receiving a stop training instruction sent by the third terminal, wherein the stop training instruction is sent by the third terminal after determining that the federation learning model to be trained is in the convergent state.

2. The model parameter training method based on federation learning of claim 1, wherein after the operation of using the first encryption federation learning model parameter as a final parameter of the federation learning model to be trained after receiving a stop training instruction sent by the third terminal, the method further comprises:

obtaining a first encryption prediction result based on the final parameter of the federation learning model to be trained and the first sample or the first encryption supplementary sample, sending the first encryption prediction result to the third terminal; and obtaining a first prediction result decrypted by the third terminal after the third terminal decrypts the first encryption prediction result.

3. The model parameter training method based on federation learning of claim 1, wherein after the operation of sending the first encryption loss value to the third terminal, for the third terminal to calculate a loss sum according to the first encryption loss value and a second encryption loss value, determining whether the federation learning model to be trained is in a convergent state according to the loss sum, the method further comprises:

calculating and sending a first encryption gradient value corresponding to the first encryption loss value to the third terminal after receiving a continuing training instruction sent by the third terminal, for the third terminal to calculate a gradient sum according to the first encryption gradient value and a second encryption gradient value, updating the first encryption federation learning model parameter according to the gradient sum to obtain a second encryption federation learning model parameter, wherein the second encryption gradient value is calculated by the second terminal according to the second sample, the second encryption supplementary sample, and the first encryption federation learning model parameter sent by the third terminal, the continuing training instruction is sent by the third terminal after determining that the federation learning model to be trained is in a non-convergent state;

obtaining the second encryption federation learning model parameter sent by the third terminal, and calculating a third encryption loss value of the first terminal according to the second encryption federation learning model parameter;

sending the third encryption loss value to the third terminal for the third terminal to calculate a new loss sun according to the third encryption loss value and a fourth encryption loss value, determining whether the federation learning model to be trained is in the convergent state according to the new loss sum, wherein the fourth encryption loss value is calculated by the second terminal according to the second sample, the second encryption supplementary sample, and the second encryption federation learning model parameter sent by the third terminal; and using the second encryption federation learning model parameter as a final parameter of the federation learning model to be trained after receiving a stop training instruction sent by the third terminal.

4. A terminal, comprising: a memory, a processor, and a model parameter training program based on federation learning stored in the memory and executable on the processor, wherein the model parameter training program based on federation learning, when executed by the processor, implements operations of the model parameter training method based on federation learning of claim 1.

5. A non-transitory storage medium, applied to a computer, wherein the non-transitory storage medium stores a model parameter training program based on federation learning, the model parameter training program based on federation learning, when executed by a processor, implements operations of the model parameter training method based on federation learning of claim 1.

6. A model parameter training method based on federation learning, applied to a third terminal, comprising the following operations:

after a first terminal uses a second encryption mapping model of a second terminal to predict a missing feature of a first sample of the first terminal to obtain a first encryption supplementary sample, and the second terminal uses a first encryption mapping model of the first terminal to predict a missing feature of a second sample of the second terminal to obtain a second encryption supplementary sample, sending, by the third terminal, a first encryption federation learning model parameter to the first terminal and the second terminal, for the first terminal to calculate a first encryption loss value according to the first encryption federation learning model parameter, the first sample and the first encryption supplementary sample, and for the second terminal to calculate a second encryption loss value according to the first encryption federation learning model parameter, the second sample and the second encryption supplementary sample, wherein the second encryption mapping model is obtained by training the second sample by a feature intersection of the first sample and the second sample, the first encryption mapping model is obtained by training the first sample by the feature intersection;

receiving and calculating a loss sum according to the first encryption loss value sent by the first terminal and the second encryption loss value sent by the second terminal, and determining whether the federation learning model to be trained is in a convergent state according to the loss sum; and sending the first encryption federation learning model parameter as a final parameter of the federation learning model to be trained after determining that the federation learning model to be trained is in the convergent state.

7. The model parameter training method based on federation learning of claim 6, wherein after the operation of sending the first encryption federation learning model parameter as a final parameter of the federation learning model to be trained after determining that the federation learning model to be trained is in the convergent state, the method further comprises:

receiving a first encryption prediction result sent by the first terminal; and decrypting the first encryption prediction result to obtain a first prediction result, and sending the first prediction result to the first terminal.

8. The model parameter training method based on federation learning of claim 6, wherein after the operation of receiving and calculating a loss sum according to the first encryption loss value sent by the first terminal and the second encryption loss value sent by the second terminal, and determining whether the federation learning model to be trained is in a convergent state according to the loss sum, the method further comprises:

sending a continuing training instruction to the first terminal and the second terminal after determining that the federation learning model to be trained is in a non-convergent state;

receiving and calculating a gradient sum according to a first encryption gradient value sent by the first terminal and a second encryption gradient value sent by the second terminal, updating the first encryption federation learning model parameter according to the gradient sum to obtain a second encryption federation learning model parameter, sending the second encryption federation learning model parameter to the first terminal and the second terminal;

receiving and calculating a new loss sum according to a third encryption loss value send by the first terminal and a fourth encryption loss value sent by the second terminal, determining whether the federation learning model to be trained is in the convergent state according to the new loss sum, wherein the third encryption loss value is calculated by the first terminal according to the first sample, the first encryption supplementary sample, and the second encryption federation learning model parameter sent by the third terminal, and the fourth encryption loss value is calculated by the second terminal according to the second sample, the second encryption supplementary sample, and the second encryption federation learning model parameter sent by the third terminal; and if the federation learning model to be trained is in the convergent state, sending a stop training instruction to the first terminal and the second terminal, and using the second encryption federation learning model parameter as a final parameter of the federation learning model to be trained.

9. The model parameter training method based on federation learning of claim 6, wherein the operation of determining whether the federation learning model to be trained is in a convergent state according to the loss sum comprises:

determining whether the federation learning model to be trained is in the convergent state according to whether the loss sum is less than or equal to a preset threshold;

determining that the federation learning model to be trained is in the convergent state if the loss sum is less than or equal to the preset threshold; and determining that the federation learning model to be trained is in a non-convergent state if the loss sum is greater than the preset threshold.

10. A terminal, comprising: a memory, a processor, and a model parameter training program based on federation learning stored in the memory and executable on the processor, wherein the model parameter training program based on federation learning, when executed by the processor, implements operations of the model parameter training method based on federation learning of claim 6.

11. A non-transitory storage medium, applied to a computer, wherein the non-transitory storage medium stores a model parameter training program based on federation learning, the model parameter training program based on federation learning, when executed by a processor, implements operations of the model parameter training method based on federation learning of claim 6.

* * * * *